July 6, 1954
C. L. SHULER
2,682,741
LAWN MOWER TRIMMING ATTACHMENT
Filed May 5, 1952
2 Sheets-Sheet 1
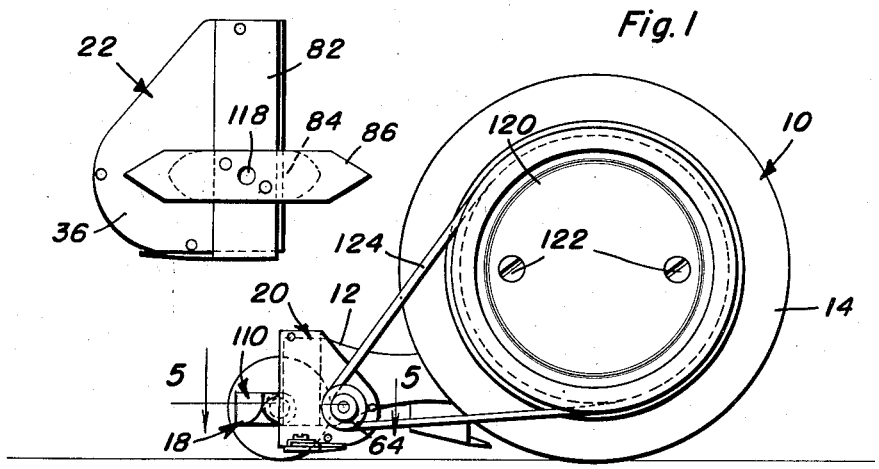
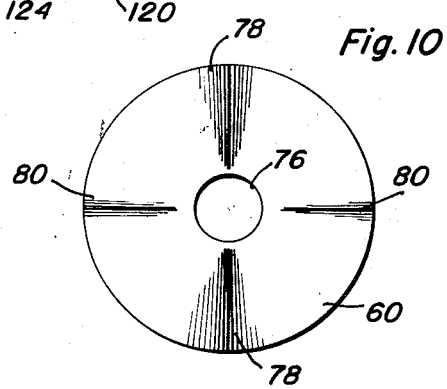
Carl L. Shuler
INVENTOR.
BY *Clarence A. O'Brien
and Harvey B. Jackson*
Attorneys July 6, 1954  C. L. SHULER  2,682,741
LAWN MOWER TRIMMING ATTACHMENT
Filed May 5, 1952  2 Sheets-Sheet 2

Carl L. Shuler
INVENTOR.

BY *Clarence A. O'Brien*
*and Harvey B. Jacobson*
Attorneys

Patented July 6, 1954

2,682,741

UNITED STATES PATENT OFFICE 2,682,741

LAWN MOWER TRIMMING ATTACHMENT

Carl L. Shuler, Rural Retreat, Va.

Application May 5, 1952, Serial No. 286,074

3 Claims. (Cl. 56—251)

This invention relates in general to attachments for lawn mowers, and more particularly to a trimming attachment adapted to be secured to a lawn mower for trimming the edges of a lawn.

The primary object of this invention is to provide an improved trimming attachment for lawn mowers in the form of a sickle bar assembly removably secured to the frame of a lawn mower and actuated in response to forward movement thereof.

Another object of this invention is to provide an improved lawn mower trimming attachment which includes a housing adapted to be removably mounted on the frame of a lawn mower and project outwardly therefrom, said frame having associated therewith a sickle bar assembly, the sickle bar of which is actuated by mechanism disposed within said housing and driven by said lawn mower.

Another object of this invention is to provide an improved lawn mower trimming attachment which is efficient in operation and of a relatively simple construction whereby it may be economically feasible.

Another object of this invention is to provide an improved trimming attachment for lawn mowers, said trimming attachment including simple attaching means whereby it may be quickly attached to existing lawn mowers with a minimum of labor and equipment.

A further object of this invention is to provide an actuating mechanism for a sickle bar of a trimming attachment for lawn mowers, said actuating mechanism including a crank arm pivotally carried by a housing and connected to one end of the sickle bar for imparting reciprocating movement thereto, said crank arm being associated with a rotating wobble plate which imparts oscillatory movement to the crank arm.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a side elevational view of a conventional lawn mower with the handle and drive mechanism omitted, said lawn mower having attached thereto in driving relation a trimming attachment, said trimming attachment being the subject of this invention;

Figure 2 is a fragmentary top plan view of the lawn mower of Figure 1 and shows the general construction of the trimming attachment and the relationship thereof with respect to the lawn mower;

Figure 3 is an enlarged end elevational view of the trimming attachment, said view being taken from the lawn mower side of the trimming attachment;

Figure 10 is an enlarged elevational view of the wobble plate for oscillatory movement to the crank arm; and, Figure 11 is an enlarged side elevational view of the wobble plate of Figure 10 and shows the manner in which it is mounted on the drive shaft, the ends of the drive shaft being broken away.

Similar characters of reference designate similar or identical elements and portions throughout the specification and throughout the different views of the drawings.

Figure 6:
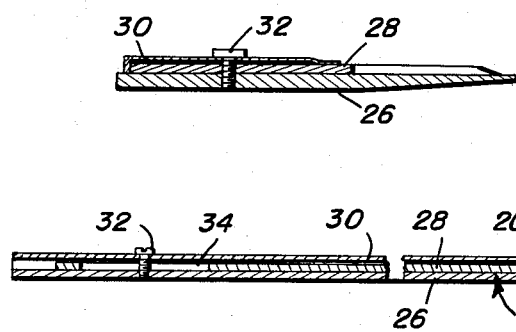
Figure 6 is an enlarged transverse vertical sectional view taken substantially on the plane indicated by the section line 6—6 of Figure 2 and shows the general construction of the sickle bar assembly.

Referring now to the accompanying drawings in detail, it will be seen that there is illustrated in Figures 1 and 2 a conventional lawn mower, which is referred to in general by the reference character 10. The lawn mower 10 includes a frame 12 on which is mounted a drive wheel 14, the cutter blade assembly 16 and a stabilizing roller assembly 18. Secured to the frame 10 at one side thereof and projecting outwardly therefrom in substantial alignment with the roller assembly 18 is the trimmer attachment 20, which is the subject of this invention.

Figure 4:
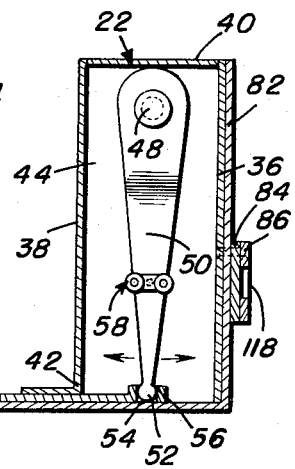
Figure 4 is an enlarged longitudinal vertical sectional view taken substantially on the plane indicated by the section line 4—4 of Figure 2 and shows the relationship of a crank arm with respect to a sickle bar reciprocated thereby, the central portion of the sickle bar assembly being omitted.
Figure 5:
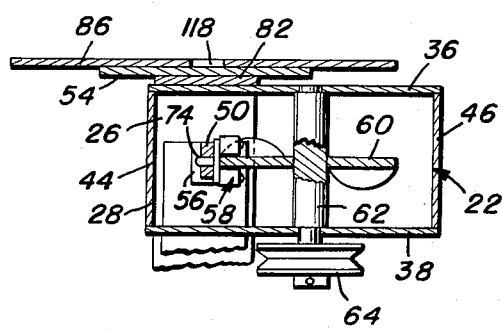
Figure 5 is an enlarged fragmentary transverse horizontal sectional view taken substantially on the plane indicated by the section line 5—5 of Figure 1 and shows the relationship of a wobble plate with respect to the crank arm and the manner in which the crank arm is oscillated.

Referring now to Figures 4 and 5 in particular, it will be seen that the trimmer attachment 20 includes a housing 22, which is removably attached to the frame 12, and a sickle bar assembly 24 which is secured to the housing 22 and extends outwardly therefrom. The sickle bar assembly 24 includes a lower stationary bar 26 on which is supported for reciprocating movement a reciprocating sickle bar 28. The reciprocating sickle bar 28 is maintained in longitudinal alignment with the stationary bar 26 by a reciprocating bar guide 30 which overlies the reciprocating bar 28 and is secured to the stationary bar 26 by a plurality of fasteners 32. It will be noted that the reciprocating bar guide 30 overlies only the untoothed portion of the reciprocating bar 28, and that the reciprocating bar 28 is provided with an elongated longitudinally extending slot 34 associated with each fastener 32 and receiving the same whereby the reciprocating bar 28 may be reciprocated between the stationary bar 26 and the reciprocating bar guide 30.

The housing 22 is hollow and is formed of a pair of spaced parallel side walls 36 and 38 which extend transversely of the longitudinal axis of the sickle bar assembly 24. The side walls 36 are generally trapezoidal in outline and are secured together at their upper ends by a horizontally extending top wall 40. The lower ends of the side walls 36 and 38 are secured to the inner ends of the stationary bar 24 and the reciprocating bar guide 30, respectively, the lower end of the side wall 38 being disposed vertically above both the lower ends of the side wall 36 and the upper surface of the fixed bar 26 to form an opening 42 through which the reciprocating bar 28 enters into the housing 22. The housing 22 is closed at the rear end thereof by a vertically extending end wall 44 and at the front end thereof by a longitudinally curved front wall 46.

Referring now to Figures 4 and 5 in particular, it will be seen that mounted within the housing 22 and pivotally connected to the rear wall thereof at its upper end by a pivot pin 48 is a depending crank arm 50. The lower end of the crank arm 50 is rounded as at 52 and engages in an opening 54 in an enlarged inner end portion 56 of the reciprocating bar 28. It will be understood that as the crank arm 50 oscillates, the reciprocating bar 28 is reciprocated longitudinally between the fixed bar 26 and the reciprocating bar guide 30.

In order that oscillatory movement may be imparted to the crank arm 50, the crank arm 50 is provided with a roller guide assembly, which is referred to in general by the reference numeral 58, the roller guide assembly 58 being in turn associated with a wobble plate 60 mounted for rotation on a shaft 62. The shaft 62 extends transversely of the housing 22 and is journaled in the side walls 36 and 38 thereof. One end of the shaft 62 extends outwardly through the side wall 38 and has mounted thereon for rotating the same a pulley 64.

Figure 9:
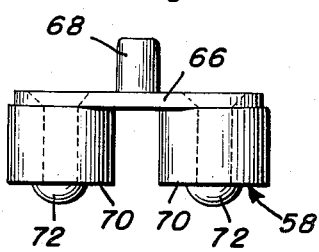
Figure 9 is an enlarged top plan view of a mounting plate and shows the relationship of guide rollers secured thereto.

Referring now to Figure 9 in particular, it will be seen that the roller guide assembly 58 includes a mounting plate 66 which has a centrally located pin 68 extending rearwardly therefrom. Secured to the front face of the plate 66 for rotation with respect thereto are a pair of spaced aligned rollers 70 which are secured to the plate 66 by rivets 72 whose rear ends are countersunk in the plate 66. The pivot pin 68 of the roller guide assembly 58 is received within an aperture 74 in the crank arm 50 and the roller guide assembly 58 is permitted to pivot with respect thereto.

Referring now to Figures 10 and 11, it will be seen that the wobble plate 60 is generally circular in outline and has a centrally located opening 76 through which the shaft 62 passes. In order that oscillatory movement may be imparted to the crank arm 50, the wobble plate 60 has projecting outwardly from one side thereof a pair of diametrically opposite curved cam portions 78. Also projecting outwardly from the surface of the wobble plate 60 is a pair of curved cam portions 80 which are also diametrically opposite and are at approximately right angles to the cam portions 78, the cam portion 80 being disposed on the opposite side from the cam portion 78. It will be understood that as the shaft 62 rotates the peripheral edge portion of the wobble plate 60 passes between the guide rollers 70 and the plate 66 is urged transversely of the general plane of the wobble plate 60 by engagement with the cam portions 78 and 80 thereon. Inasmuch as the cam portions 78 and 80 project from opposite sides of the wobble plate 60, reciprocating movement is imparted to the plate 66, which is in turn imparted to the crank arm 50.

Figure 8:
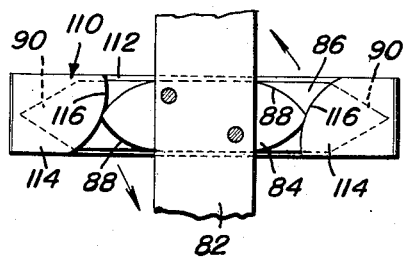
Figure 8 is an enlarged fragmentary transverse vertical sectional view taken substantially on the plane indicated by the section line 8—8 of Figure 2 and shows the relationship of the means for detachably connecting the trimming attachment to a bracket carried by the lawn mower.

In order that the trimming attachment 20 may be conveniently connected to the lawn mower 10, the housing 22 has secured to the side walls 36 thereof a vertically extending bar 82. Secured to the vertically extending bar 82 and extending transversely thereof are inner and outer mounting bars 84 and 86, respectively. As is best illustrated in Figure 8, the inner mounting bar 84 is shorter than the outer mounting bar 86 and is provided with curved cam end portions 88. The outer mounting bar 86 is provided with pointed end portions 90 for a purpose which will be explained in more detail hereinafter.

Figure 7:
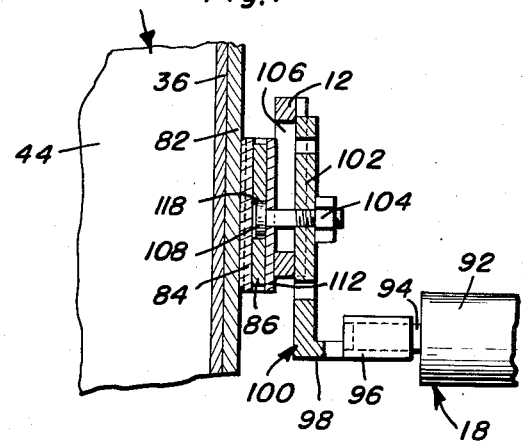
Figure 7 is an enlarged fragmentary transverse vertical sectional view taken substantially on the plane indicated by the section line 7—7 of Figure 2 and shows the manner in which the trimming attachment is connected to the frame of the lawn mower.

Referring now to Figure 7 in particular, it will be seen that the frame 12 has a rearwardly extending portion to which is connected the stabilizing roller assembly 18. The stabilizing roller assembly 18 includes a transversely extending roller 92 which includes an outwardly extending shaft 94 of a reduced diameter which is received in a boss portion 96 of a horizontally disposed leg 98 of an L-shaped support arm 100. The L-shaped support arm 100 includes a vertical leg 102 which is adjustably clamped to the rearwardly extending leg of the frame 12 by a fastener 104 which extends through an elongated vertically extending slot 106 in the frame 12 whereby the roller assembly 18 may be vertically adjusted. It will be noted that the fastener 104 is provided with a rounded head 108.

In order that the trimming attachment 20 may be secured to the frame 12, there has been secured to the outer side of the rearwardly extending leg of the frame by the fastener 104 a C-shaped mounting bracket which is referred to in general by the reference numeral 110. The C-shaped mounting bracket includes a base 112 which is clamped against the frame 12 and a pair of inwardly extending flanges 114, the flanges 114 being provided with curved cam free ends 116. When it is desired to secure the trimming assembly 20 to the mounting bracket 110, the mounting bars 84 and 86 are turned at a slight angle to the horizontal and pass between the free cam ends 116 of the inwardly turned flanges 114. A centrally located opening 118 in the mounting bar 86 has received therein a rounded head 108 of the fastener 104 which forms a pivot. The mounting bars 86 are rotated about the rounded head 108 with the result that the pointed ends 90 of the mounting bar 86 pass in between the web 112 and the flanges 114 of the mounting bracket 110, the pointed ends of the mounting bar 86 being pointed to provide clearance between the ends thereof and the ends of the mounting bracket 110. When the mounting bar 84 is rotated along with the rotation of the mounting bar 86, the cam ends 88 become engaged with the cam free ends 116 of the flanges 114 with the result that the mounting bars 84 and 86 are locked in the mounting bracket 110.

In order that the shaft 62 may be rotated, the wheel 14 of the lawn mower 10 has secured to the central portion thereof, preferably the hub cap, a drive pulley 120 by a plurality of fasteners 122. Entrained over the drive pulley 120 and the pulley 64 is a drive belt 124. It will be understood that the pulley 120 is of a much larger diameter than the pulley 64 whereby the shaft 62 is rotated at a rapid rate with respect to the rotation of the wheel 14. Due to the novel construction of the wobble plate 60, the reciprocating bar 28 is reciprocated two full strokes for each rotation of the shaft 62.

While the trimming attachment 20 may be attached to the lawn mower 10 during normal grass cutting operations, it is generally preferred to remove the same while cutting the grass in open spaces. Inasmuch as the trimming attachment 20 is light in weight and may be secured to the mounting bracket 110 carried by the frame of the lawn mower in a few seconds, the removal and replacement of the trimming attachment is governed entirely by the desire of the operator of the lawn mower 10 for utilizing the trimming attachment 20.

The operation of this device will be understood from the foregoing description of the details thereof, taken in connection with the above recited objects and drawings. Further description would appear to be unnecessary.

Minor modifications of the device, varying in minor details from the embodiment of the device illustrated and described herein, may be resorted to without departure from the spirit and scope of this invention, as defined in the appended claims.

Having described the invention, what is claimed as new is:

1. A trimming attachment for lawn mowers comprising a sickle bar assembly adapted to be mounted at one side of said lawn mower, actuating mechanism associated with the sickle bar for reciprocating the same in response to movement of the lawn mower, said sickle bar assembly being carried by a housing, said housing being adapted to be removably connected to a support for a roller of the lawn mower, means carried by said housing for connecting said housing to a roller support including a C-shaped bracket adapted to be rigidly secured to a roller support; attaching bars removably connected to said bracket.

2. A trimming attachment for lawn mowers comprising a housing detachably secured to said lawn mower adjacent a wheel thereof, a shaft extending through said housing, drive means connecting said shaft to said wheel, a wobble plate carried by said shaft within said housing, a crank arm pivotally carried by said housing, means carried by said crank arm for imparting motion thereto from said wobble plate, a sickle bar assembly carried by said housing and projecting outwardly therefrom, said sickle bar assembly being operatively connected to said crank arm, said means carried by said crank arm including a pair of spaced rollers mounted on a supporting plate pivotally carried by said crank arm, said rollers being disposed on opposite sides of said wobble plate.

3. A trimming attachment for lawn mowers comprising a housing detachably secured to said lawn mower adjacent a wheel thereof, a shaft extending through said housing, drive means connecting said shaft to said wheel, a wobble plate carried by said shaft within said housing, a crank arm pivotally carried by said housing, means carried by said crank arm for imparting motion thereto from said wobble plate, a sickle bar assembly carried by said housing and projecting outwardly therefrom said sickle bar assembly being operatively connected to said crank arm, said housing being secured to said lawn mower by a supporting plate removably positioned in a C-shaped mounting bracket carried by said lawn mower, a camming plate carried by said housing engaging opposed edges of said mounting bracket to lock said supporting plate within said mounting bracket.

References Cited in the file of this patent

UNITED STATES PATENTS

| Number | Name | Date |
| --- | --- | --- |
| 605,927 | Shulin | June 21, 1898 |
| 1,163,745 | Faulkner | Dec. 14, 1915 |
| 1,858,690 | Stokes | May 17, 1932 |
| 2,385,568 | Draim | Sept. 25, 1945 |
| 2,476,190 | Haefner | July 12, 1949 |